United States Patent

[11] 3,608,769

| [72] | Inventor | Kenneth A. Gablin<br>Tacoma, Wash. |
|---|---|---|
| [21] | Appl. No. | 831,512 |
| [22] | Filed | June 9, 1969 |
| [45] | Patented | Sept. 28, 1971 |
| [73] | Assignee | Nuclear Engineering Company, Inc.<br>San Francisco, Calif. |

[54] SHIPPING CONTAINER ARRANGEMENT
15 Claims, 5 Drawing Figs.

[52] U.S. Cl. .................................................. 220/10,
206/46 FR, 220/15
[51] Int. Cl. ...................................................... B65d 7/22
[50] Field of Search ............................................ 206/46 FR;
220/15, 10; 229/14 C

[56] References Cited
UNITED STATES PATENTS

| 1,627,344 | 5/1927 | Scott | 206/46 FR UX |
|---|---|---|---|
| 2,301,657 | 11/1942 | Hlavaty | 220/10 |
| 2,516,124 | 7/1950 | Kishibay | 217/53 X |
| 2,766,920 | 10/1956 | Rawley | 229/14 C X |
| 2,782,956 | 2/1957 | Richman | 220/10 |

*Primary Examiner*—Joseph R. Leclair
*Assistant Examiner*—James R. Garrett
*Attorney*—Schapp and Hatch ABSTRACT: An improved hazardous materials shipping container arrangement for providing puncture and penetration resistance, flame resistance, shock absorption and thermal insulation by surrounding a standard drum with a multilayered structure to provide the various desired protections. An energy-absorbing crushable wrap is provided around the drum and extending axially longer than the drum to provide cavities at the drum ends occupied by energy-absorbing crushable plugs, an energy-reflective layer, such as aluminum foil, is wound around the outside of the energy-absorbing elements to provide thermal radiation protection. The entire assembly of the drum and the energy-absorbing wrap and the end plugs is positioned inside a lightweight outer steel drum that preferably is slightly greater in size than the energy-absorbing wrap. The outer steel drum or shell provides puncture and penetration resistance and acts as a flame barrier. The inner energy absorption core provides shock absorption and thermal insulation.

PATENTED SEP 28 1971 3,608,769

INVENTOR.
KENNETH A. GABLIN
BY
Schapp & Hatch
ATTORNEYS

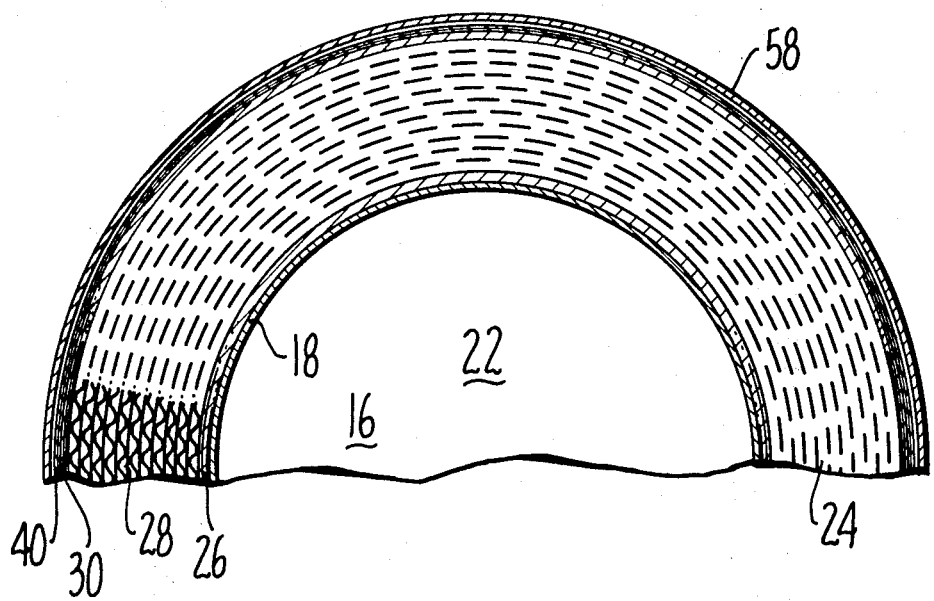
FIG. 2.
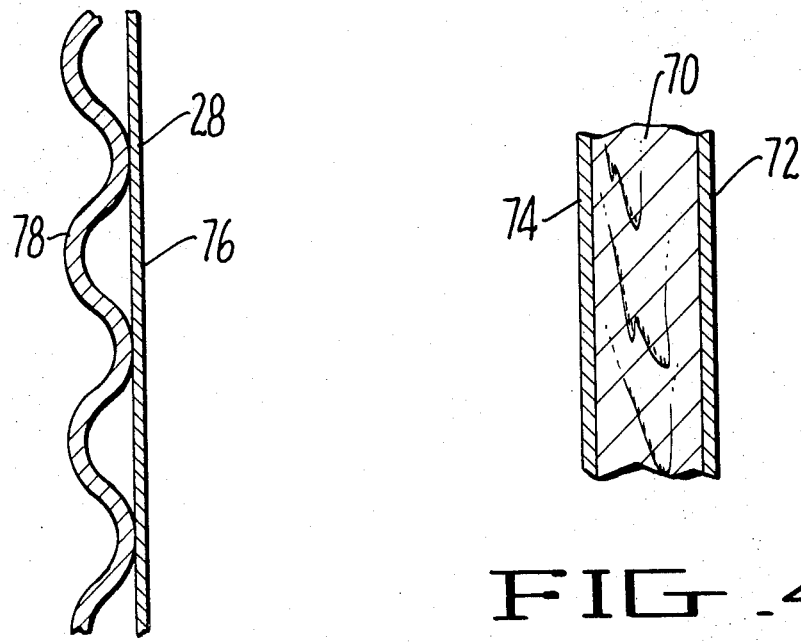
FIG. 3.
FIG. 4.
INVENTOR.
KENNETH A. GABLIN
BY
Schapp & Hatch
ATTORNEYS

SHIPPING CONTAINER ARRANGEMENT

BACKGROUND OF THE INVENTION

1. Field of the Invention

This invention relates to a shipping container arrangement and more particularly to an improved shipping container for shipping materials that must be protected against spillage, heat, shock, etc., such as various types of hazardous materials.

2. Description of the Prior Art

There has long been a need in many applications for a shipping container arrangement that provides good puncture and penetration resistance and flame resistance as well as chock absorption and thermal insulation to the material being shipped. When the material being shipped is hazardous material such as explosives, flammables, oxidizing agents, corrosive liquids, compressed gases, etiologic agents, other hazardous chemicals, or nuclear material such as nuclear waste as, for example, specified by the U.S. Department of Transportation in 49 CFR 170–190, it becomes, of course, more than just a matter of convenience but a matter of absolute necessity to provide a shipping container for such materials that is highly resistant to any anticipated puncture, penetration, flames or shocks. Further, since some of these containers are often completely disposed of, that is for example, by dumping the entire 3 container assembly into the ocean or burying it in some very deep mine shaft, it is desirable that materials utilized in the shipping container be comparatively inexpensive. Additionally, it is preferable that in other applications, as much of the shipping container as possible be readily reusable.

While directing the invention towards the particular problems associated with the shipping of hazardous materials, such as waste nuclear materials, it will be appreciated that the improved shipping container described herein can equally well be utilized when shipping any materials for which the type of protection afforded by applicant's invention herein is desired.

Prior art shipping containers heretofore utilized, particularly for shipping waste nuclear material, have often proven to be extremely heavy in themselves and not capable of withstanding the desired range of thermal effects, shock, puncture or penetration.

Therefore, there has long been a need for a shipping container particularly suited for meeting the high requirements for shipping hazardous material that is nevertheless fabricated from comparatively inexpensive and readily available materials.

SUMMARY OF THE INVENTION it is an object of applicant's invention herein to provide an improved shipping container.

It is another object of applicant's invention herein to provide a comparatively inexpensive shipping container that has a high degree of resistance to puncture, penetration, flame shock and thermal affects.

It is yet another object of applicant's invention to provide a comparatively inexpensive shipping container using readily available materials and particularly adapted to shipping hazardous material.

The above and other objects and the other desiderata of applicant's invention are achieved, according to the preferred embodiments thereof, by providing an overpack structural arrangement for a standard 55 gallon drum. The 55 gallon drum is a very common, commercially available shipping drum that can be readily obtained virtually throughout the entire United States. The drum serves as an inner drum having the shipping cavity therein and the material to be shipped, which for example, may be hazardous material such as waste nuclear material or the like, is placed within the 55 gallon drum and the drum is suitably closed.

Applicant's overpack configuration for the 55-gallon drum comprises a drum energy-absorbing wrap around the 55-gallon drum that is generally comprised of a multilayered structure. The drum energy-absorbing wrap extends axially longer than the 55-gallon drum at both the top and bottom thereof to provide a top cavity adjacent the top surface of the 55-gallon drum and a bottom cavity adjacent the bottom surface of the 55-gallon drum. The energy-absorbing wrap around the drum comprises a first drum flexible laminent layer surrounded by a drum-crushable layer having a preselected thickness. If desired, a second drum flexible laminent layer may be wrapped around the external periphery of the crushable layer. However, it has been found that satisfactory performance of the shipping container can be obtained even without the second drum flexible layer. In the preferred embodiments of applicant's invention, the first drum laminent layer comprises a laminent comprised of a central core of approximately one-tenth of an inch wood veneer sandwiched between two layers of paper, one on each side. A material manufactured by the Weyerhaeuser Company, Olympia, Washington, under their trade name "Ply-veneer" has been utilized for this purpose. The paper utilized by Weyerhaeuser in their Ply-Veneer is generally 42 pound Draft paper. The second, outer laminent layer, if utilized, is also comprised of the same type of laminent Ply-Veneer structure. The crushable layer around the first drum flexible Ply-Veneer layer is a single faced "A" flute corrugated cardboard, in the preferred embodiment of the invention, and when utilized with the 55-gallon size drum a thickness of multiple wrappings equivalent to approximately 4 inches in radial thickness is provided.

Forming the outermost layer of the energy absorbing wrap is a layer of reflective material which, for example, could be aluminum foil. One or several layers of aluminum foil can be included as desired.

A top plug and a bottom plug, which are substantially identical, are also provided to fit in the top cavity and bottom cavity adjacent the upper surface and lower surface of the inner drum. These are comprised, each, of a pair of spaced-apart circular discs of the Ply-Veneer having a diameter approximately equivalent to the diameter of the steel drum. Around the outermost periphery of the discs is an outer multiple, spiral wrap of the single-faced corrugated paperboard with the corrugations extending axially. This has an approximately 1-inch radial thickness. Inside the spiral wrap are a plurality of random layer "A" flute corrugated cardboard discs. These end plugs fit into the top and bottom cavity to provide a crushable plug for protection against axial movement of the drum. For additional fire resistance, the outer edges of the top and bottom plugs may be wrapped with reflective material such as aluminum foil.

The entire assembly comprising the drum, the energy-absorbing overwrap and the two end plugs is placed in a steel container that has approximately one-half inch or so radial clearance. The out rigid drum has a base portion with the base end and sidewalls extending up to the top of the overwrap. The outer drum is also provided with a cover portion that has a top plate and sidewalls that overlap and extend down in axial directions a preselected distance over the sidewalls of the base portion. A plurality of latches, for example, may be included to retain the cover on the drum.

BRIEF DESCRIPTION OF THE DRAWINGS

FIG. 2 is a fragmentary cross-sectional view taken substantially on the plane of line 2—2 of FIG. 1;

FIG. 3 is a fragmentary sectional view on an enlarged scale of a typical "A" flute corrugated cardborad material used in the shipping container arrangement of FIG. 1;

FIG. 4 is a fragmentary sectional view on an enlarged scale of a typical Ply-Veneer material used in the shipping container arrangement of FIG. 1.

Referring now to FIG. 1 there is shown one embodiment of applicant's invention generally designated 10. As shown thereon there is provided an inner rigid-walled drum member generally designated 12. In the preferred embodiment of applicant's invention the inner rigid wall drum member 12 comprises a standard shipping drum such as the 55 gallon drum. Applicant prefers to utilize readily available commercial parts in order to achieve the comparatively low cost and high performance desired in the practice of applicant's invention herein.

Figure 1:
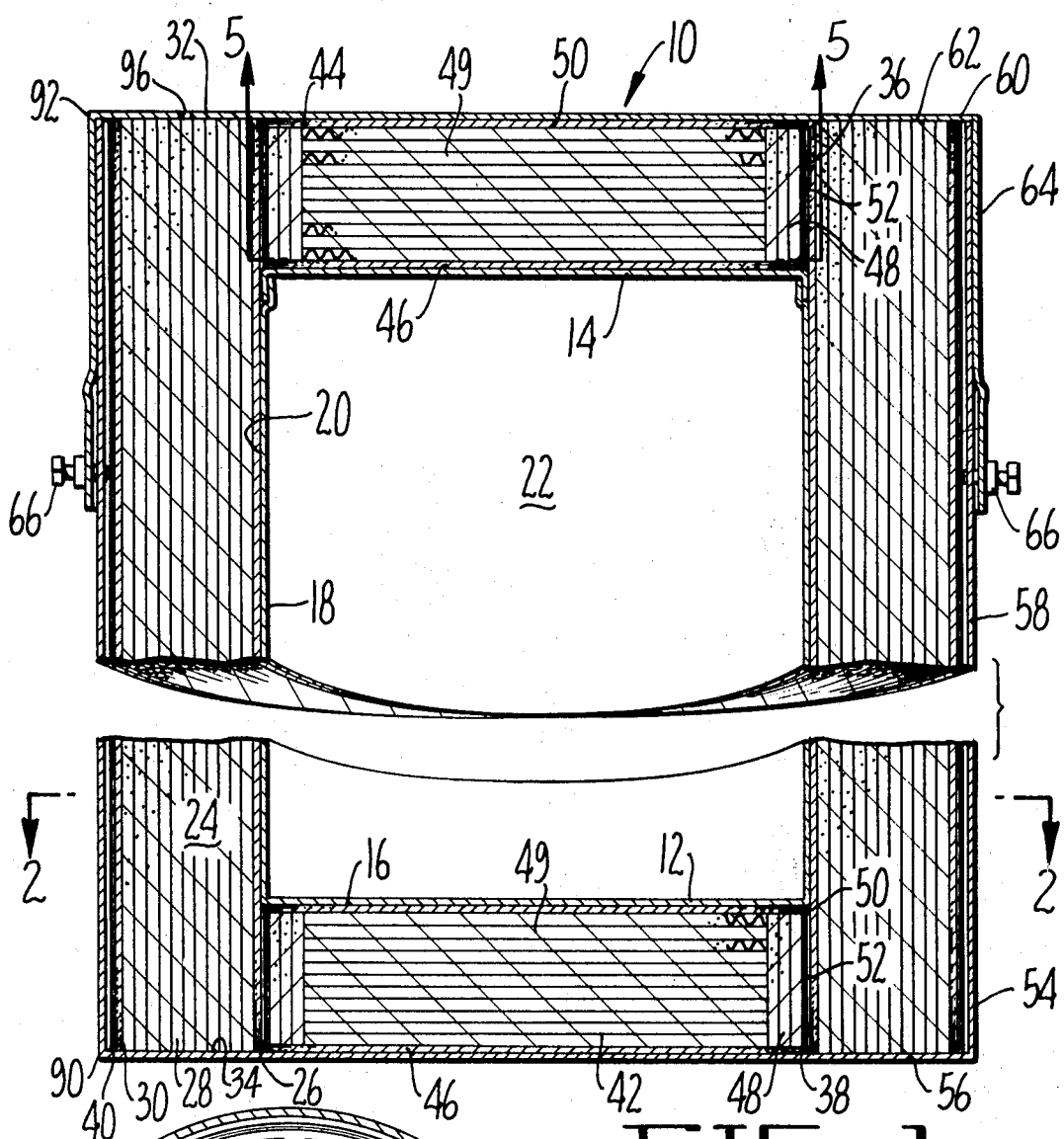
FIG. 1 is a vertical sectional view through a shipping container arrangement, made in accordance with the present invention, with portions thereof being broken away to conserve space.

The rigid wall inner drum member has a top wall 14, a bottom wall 16 and a sidewall 18 having an external peripheral surface 20. The top wall 14, bottom wall 16 and sidewall 18 define a generally cylindrical material storage cavity 22. The material that is to be shipped in applicant's improved shipping container (not shown) is stored in this storage cavity 22.

A drum energy-absorbing overwrap, generally designated 24, is provided surrounding the external peripheral wall surface 20 of the inner drum member 12. The energy-absorbing overwrap 24 is comprised of a first, or inner drum, flexible laminent layer 26, a crushable energy-absorbing layer 28 having a preselected thickness and, if desired, an outer or second drum flexible laminent layer 30 in a sandwich array. That is, the first drum flexible laminent layer 26 surrounds and is adjacent to the external wall surface 20 of the inner drum 12. The drum crushable layer 28 surrounds and is adjacent to the first drum flexible laminent layer 26. The second or outer drum flexible laminent layer 30, if provided, surrounds the drum crushable layer 28. The drum energy-absorbing layer 24 has top edges 32 and bottom edges 34 that extend beyond the top surface 14 and bottom surface 16, respectively, of the inner drum 12 to define a top cavity 36 and a bottom cavity 38 therewith. That is, the axial length of the drum energy-absorbing overwrap 24 is greater than the axial length of the inner drum 12.

A thin flexible drum reflective layer 40 is wrapped around the outside of the second drum flexible laminent layer 30, if such is included. If not, the reflective layer 40 is wrapped around the outside of the crushable layer 28.

The reflective layer 40 may, if desired, comprise a plurality, for example, three layers of 1 mil aluminum foil for reflecting radiant energy impingent thereon radially outwardly to prevent the transmission of thermal energy therethrough towards the interior and the inner rigid wall drum means 12.

In order to fill the cavities 36 and 38, applicant prefers to use a top plug 44 and a bottom plug 42. Each of the plugs is substantially identical to the other, in this embodiment of applicant's invention, and comprises a pair of spaced-apart laminent layers 46 and 50 substantially circular in shape to match the shape of the bottom, and top, of the drum 12. However, applicant has found that tight fits are not required and hence a small radial clearance between the outer periphery of the top plug 44 and bottom plug 42 and the drum laminent layer 26 is satisfactory.

A spirally wound rim comprising a crushable layer 48 having a predetermined radial width which, for example, may be on the order of 1 inch, is positioned near the outer peripheral edges of the top plug 44 and bottom plug 42 and intermediate the laminent layers 46 and 50, for example. A flexible reflective layer 52 may be provided around the outside of the crushable layer 48. A plurality of randomly oriented "A" flute corrugated cardboard discs 49 are positioned inside the spiral wrap 48 for shock absorption. An outer rigid drum member 54 having a base portion 56, sidewall 58 and a cover 60 is provided in which to encase the assembly comprised of the overwrap 24, inner rigid wall drum 12 and top plug 44 and bottom plug 42. Applicant prefers to have a small radial clearance between the reflective layer 40 and the sidewall 58 of the out rigid wall drum 54. In the preferred embodiment of applicant's invention the cover 60 has a lid section 62 overlying the top edges of the energy-absorbing layer 24 and top plug 44 and a sidewall portion 64 that extends axially downwardly along the sidewalls 58 of the base portion 54. A plurality, for example four, fastening devices such as latches 66 may be provided to retain the cover 60 on the base portion 54 to enclose the contents therein.

FIG. 4 illustrates a preferred form for the laminent layers 26, 30 and upper and lower laminent layers 50 and 46, respectively, of the lower plug 52 and upper plug 44. As indicated above, the laminent structure is a product of Weyerhaeuser Company, Olympia, Washington sold under the trade name "Ply-Veneer" and has a wood core 70 to which is bonded on its exterior surfaces paper coatings 72 and 74 which, in a preferred form of applicant's invention, are 42 pound Kraft paper, that is, weighing 42 pounds per 1,000 square feet thereof. This is the material utilized in the above-mentioned Weyerhaeuser "Ply-Veneer" preferred by applicant for utilization of his invention. It has been found that the thickness of the laminent layer such as the laminent layers 26, 30, 46 and 50 will be on the order of one-eighth of an inch. While applicant has described the Weyerhaeuser "Ply-Veneer" as a preferred structure for this layer of applicant's improved packaging arrangement, it will be appreciated that other similar layers having similar characteristics may equally well be utilized.

Figure 5:
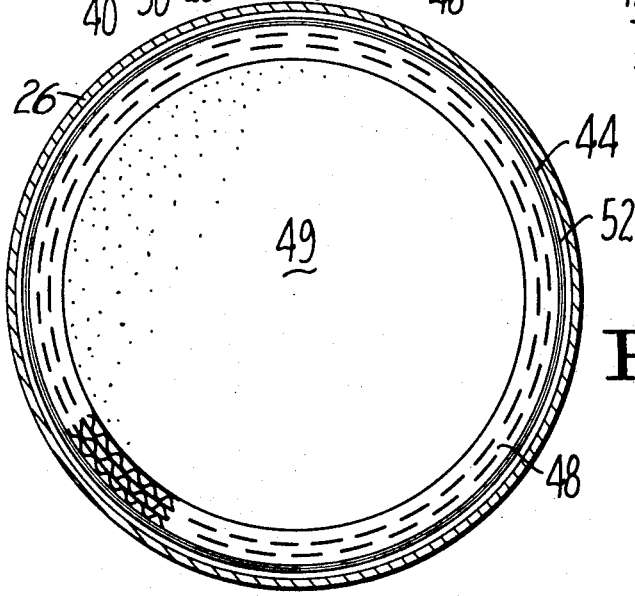
FIG. 5 is a cross-sectional view taken substantially on the plane of line 5—5 of FIG. 1.

The drum crushable layer 28 and the crushable layer 48 and discs 49 in the bottom plug 42 and, similarly, the top plug 44 may be fabricated from any crushable material such as honeycomb or the like. However, it has been found that a particular type of cardboard in these positions have proven to be superior for the purposes intended. FIG. 3 illustrates one form of a corrugated cardboard that applicant has found satisfactory for the purpose. As shown on FIG. 3, which is a representation of a typical section through the corrugated cardboard material used to make the drum crushable layer 28, this material comprises what is known as "A" flute corrugated paperboard having an 18-pound Kraft paper 76 as the single noncorrugated base layer and 33 pound Kraft paper 78 providing the corrugated layer bonded thereto. In practice, applicant prefers that the corrugations of the layer 78 are positioned radially outward from its associated base layer 76 during the spiral winding of layer 28, as shown in FIG. 2 and FIG. 5.

The outer rigid wall drum member 54 has been found to be satisfactory when comprised of steel in the range of 20 to 26 gauge sheet metal.

Applicant prefers to have a space in between the outer drum reflective layer 40 and the outer rigid wall drum member 54 of approximately one-half inch. With these configurations in mind, the drum crushable layer 28 preferably has a thickness on the order of 4 inches of the spiral wound single-layer corrugated cardboard. As thus described, the overpack, that is, all of the materials other than the 55 gallon drum 12, normally weighs less than 30 percent more than the maximum net weight of the contents placed in the cavity 22. Further, comparatively small additional volume over that occupied by the inner drum is required for the overwrap in the shipping container arrangement of the present invention.

It will be appreciated that while the preferred embodiment of applicant's invention has been directed towards utilization in this application where a standard 55-gallon drum was utilized and, more particularly, where material to be shipped is nuclear waste material, the same structural arrangement heretofore described, suitably adjusted for the scale and size, may be used for many other types of shipping arrangements as desired.

The Department of Transportation of the United States Government has instituted certain specified tests in order to qualify a shipping container as satisfactory for utilization to ship radioactive waste. These tests are rather severe and in general they comprise:

1. 30-foot drop test on concrete pad;
2. 40-inch drop test on 6-inch diameter steel bar;
3. 1475° F. fire test for 30 minutes; and
4. Water test by immersion.

The above-described tests were performed utilizing the structure of applicant's invention herein as shown in the drawings hereto. In the 30-foot drop test the shipping container 10 was dropped so that it fell through 30 feet onto a 1-foot thick concrete pad reinforced with right-angle ¾-inch diameter crossties. The shipping container with dummy load weighed approximately 500 pounds and was dropped so that it impacted on a bottom edge 90 or a top edge 92 directly under the center of gravity. Since the basic shipping container as above described is to absorb impact energy by deformation of the outer rigid wall drum member 54 and the drum crushable layer 28, it was found that while the outer drum 54 would have an edge flattened and outward bulging, the outer rigid wall drum member 54 did not burst and the drum 12, though bent and somewhat deformed, was intact and the contents in the cavity 22 were completely contained. During the drop test it was found that while the latches 66 are desirable for the handling and movement of the shipping container 10, the comparatively long sidewall portion 64, when the shipping container 10 was dropped on the edge 92, tended to bind on the sidewalls 58 of the base portion and prevent the cover 60 from dropping away. Thus, the latches 66 need not be overly strong but rather can be comparatively inexpensive for merely retaining the cover.

The shipping container 10 was dropped onto a 6-inch diameter steel bar through 40 inches and oriented so as to impact on its side and on its top. The impact was absorbed by deformation in the outer steel drum member 54 and crushing the drum crushable layer 28. The inner rigid wall drum member 12 which, in these tests was a drum, was not ruptured nor were the contents released.

When the shipping container 10 was subjected to a radiant source of thermal energy to achieve as a desired objective a uniform 1,475° F. it was found that gases were emitted from the paperboard, cardboard and "Ply-Veneer" and they were emitted from the outer rigid wall drum member 54. Since there is very little oxygen within the shipping container 10, these hot gases, while combustible, exit at a fast enough rate when the exit aperture, such as around the cover 60 or through purposely placed small apertures therethrough such as the apertures 96, the velocity of escaping gases is greater than the rate of flame propogation and thus no flame can be generated within the shipping container 10. All combustion took place external the shipping container 10. As result of the above tests, it was found that the aluminum foil layer such as the flexible layer 40 and the flexible reflective layer 52 acts both as a thermal barrier for reflecting radiant energy and as a trap for containing air in the flute of the corrugated cardboard in the drum crushable layer 28. The trapped air acts as an air spring during impact resistance. It was found that while there were some deformations during some of the tests of the inner rigid wall drum member 12, the integrity of this drum was at all times complete. During the thermal test described above, it was found that the temperature of the inner drum 12 stayed comparatively low.

From the above it can be seen that applicant has provided an improved impact resistant, penetration resistant, and fire and thermal energy resistant shipping container that is particularly adaptive for utilization with the shipping of goods subjected to severe environmental conditions.

What is claimed is new and desired to be secured by Letters Patent of the United States is:

1. An improved shipping container arrangement of the type adapted to provide thermal and shock insulation to the material being shipped and comprising, in combination:
    a rigid-walled inner drum member for containing the material to be shipped, and said rigid-walled inner drum member having a top wall, a bottom wall and a peripheral wall defining a shipping cavity;
    a drum energy-absorbing wrap having a preselected thickness and positioned around said peripheral wall of said inner drum, and said drum energy-absorbing wrap comprising:
        a first drum flexible laminent layer immediately adjacent said peripheral surface of said inner drum;
        a drum crushable layer around said first drum flexible laminent layer; and
    said drum energy-absorbing wrap having top edges and bottom edges in axially spaced-apart relationship from said top wall and said bottom wall of said inner drum to define therewith top and bottom cavities, respectively;
    a top plug and a bottom plug positioned in said top cavity and said bottom cavity, respectively,
    and each of said top plug and bottom plug comprising:
        an outer spiral wound rim having a preselected radial thickness and having external surfaces:
        a flexible thin sheet plug reflective layer around said external surfaces of said spiral wound rims;
        said spiral wound rim having top edges and bottom edges, and said top plug and said bottom plug being positioned interiorly of said first drum flexible laminent layer in said top cavity and said bottom cavity, respectively;
        a substantially coextensive top laminent layer and a bottom laminent layer on said top edges and said bottom edges, respectively, of said spiral wound rim and said top laminent layer and said bottom laminent layer being substantially coextensive with said top wall and said bottom wall of said inner drum member;
    an outer rigid wall drum member having a base portion and a cover portion, said base portion having a bottom wall and a sidewall extending upwardly from said bottom wall to define a storage cavity, said inner drum member and said drum energy-absorbing wrap and said top plug and said bottom plug being positioned in said storage cavity, said outer rigid drum member having a cover portion detachably coupled to its sidewall; and
    a flexible, thin sheet drum reflective layer wrapped around the peripheral wall portion of said drum energy-absorbing wrap and spaced a preselected distance from the sidewall of said outer rigid wall drum member.

2. The arrangement defined in claim 1 wherein: said cover portion has a top wall and a peripheral side wall, and said cover portion sidewall overlaps a predetermined length of said sidewall of said base portion; said cover portion is detachably coupled to said base portion by a plurality of latch members; a second drum flexible laminent layer is positioned around said drum crushable layer of said drum energy-absorbing wrap; and, said top plug and said bottom plug further comprising: a plurality of crushable disc members positioned inside said spiral wound rim and intermediate said top and bottom laminent layers.

3. The arrangement defined in claim 2 wherein:
said first drum flexible laminent layer and said second drum flexible laminent layer and said plug top laminent layer and said plug bottom laminent layer of said top plug and said bottom laminent layer of said top plug and said bottom plug all comprise a laminent having a wood veneer on the order of 0.1-inch thick base member sandwiched between paper layers on either side thereof.

4. The arrangement defined in claim 3 wherein:
said drum crushable layer and said plug crushable layer of said top plug and said bottom plug all comprise spirally wound, single faced, corrugated cardboard.

5. The arrangement defined in claim 4 wherein:
said drum reflective layer and said plug reflective layer all comprise a plurality of layers of 1 mil aluminum foil.

6. The arrangement defined in claim 5 wherein: said inner rigid wall drum member comprises a 55-gallon steel drum; and said outer rigid wall drum member comprises cold-rolled steel having a thickness in the range of 20 to 26 gauge.

7. The arrangement defined in claim 6 wherein: said drum reflective layer is spaced from said outer rigid wall drum member on the order of one-half inch; said preselected radial thickness of said drum energy-absorbing wrap is on the order 4 inches; said preselected radial thickness of each of said spiral wound rims of said top plug and said bottom plug is on the order of 1 inch; said top plug and said bottom plug have an axial length on the order of 6 inches and are positioned in said top cavity and said bottom cavity, respectively; said predetermined length of said overlap of said side wall of said cover portion along said sidewall of said base portion is on the order of 12 inches; said drum energy-absorbing layer has a length between said top and said bottom edges on the order of 48 inches; and said paper of said laminent layers is 42 pound Kraft paper.

8. A shipping container arrangement for thermal and shock protection of material being shipped, comprising
   a rigid-walled inner container adapted to enclose material being shipped,
   a layer of substantially noncrushable flexible laminate material surrounding said inner container and extending past the ends thereof to define open end cavities therewith,
   a relatively thick energy-absorbing wrap of crushable material jacketing said layer of laminate material,
   energy-absorbing plugs of crushable material mounted in said end cavities,
   end layers of substantially noncrushable flexible laminate material in said end cavities interiorly of said plugs,
   a flexible relatively thin layer of energy reflective material enclosing said energy-absorbing wrap and plugs and said end layers of laminate material, and
   a rigid-walled outer container surrounding said layer of energy reflective material.

9. A shipping container arrangement as described in claim 8, and wherein said inner container is a standard steel shipping drum, and said outer container is formed of relatively thin sheet metal.

10. A shipping container arrangement described in claim 8, and wherein said laminate material comprises a layer of wood veneer bonded to outer layers of paper.

11. A shipping container arrangement as described in claim 8, and wherein said energy-absorbing wrap comprises a plurality of layers of corrugated cardboard.

12. A shipping container arrangement as described in claim 11, and wherein said layers of corrugated cardboard are provided by a spirally wrapped sheet of cardboard having a smooth inner face and a corrugated outer face.

13. A shipping container arrangement as described in claim 8, and wherein said energy-absorbing plugs comprise a plurality of corrugated cardboard disks jacketed by a spirally wound sheet of corrugated cardboard.

14. A shipping container arrangement as described in claim 8, wherein said energy reflective material comprises a metal foil.

15. A shipping container arrangement as described in claim 14, and wherein said energy reflective material comprises a plurality of layers of aluminum foil.